United States Patent [19]
Minobe

[11] Patent Number: 4,855,553
[45] Date of Patent: * Aug. 8, 1989

[54] METHOD OF HEATING POLYVINYL CHLORIDE USING MICROWAVES

[76] Inventor: Tomio Minobe, 18-3, Nobidome 4-chome, Niiza-shi, Satiama-pref., Japan

[*] Notice: The portion of the term of this patent subsequent to Jul. 8, 2003 has been disclaimed.

[21] Appl. No.: 555,981

[22] Filed: Nov. 29, 1983

[30] Foreign Application Priority Data

Feb. 24, 1983 [JP] Japan .................. 58-29945

[51] Int. Cl.$^4$ .............................................. H05B 6/64
[52] U.S. Cl. .............................. 219/10.55 M; 264/25
[58] Field of Search ............... 219/10.55 M, 10.55 R, 219/10.55 A, 10.69, 10.81; 528/503; 264/24, 25, 26, 27, 567, DIG. 65

[56] References Cited

U.S. PATENT DOCUMENTS

| | | | |
|---|---|---|---|
| 3,771,234 | 11/1973 | Forster et al. | 219/10.55 M |
| 3,884,742 | 5/1975 | Roberts | 219/10.81 X |
| 4,439,381 | 3/1984 | Gagliani et al. | 264/26 |
| 4,444,700 | 4/1984 | Fondren | 264/24 |
| 4,459,249 | 7/1984 | Matsuda | 264/26 |

FOREIGN PATENT DOCUMENTS

| | | | |
|---|---|---|---|
| 54-106946 | 8/1979 | Japan | 219/10.55 M |
| 2081560 | 2/1982 | United Kingdom | 219/10.55 M |

Primary Examiner—E. A. Goldberg
Assistant Examiner—M. M. Lateef
Attorney, Agent, or Firm—Birch, Stewart, Kolasch & Birch

[57] ABSTRACT

A method of heating polyvinyl chloride (PVC) using microwaves which is suitable for application in a process for producing PVC film or sheet. The microwave energy is applied to the PVC after the temperature of the PVC has been raised to the point that its intermolecular bonding force has weakened and molecular vibration occurs readily. As a result, uniform heating is obtained throughout the PVC with high energy utilization efficiency.

6 Claims, 2 Drawing Sheets

METHOD OF HEATING POLYVINYL CHLORIDE USING MICROWAVES

BACKGROUND OF THE INVENTION

1. Field of the Invention

This invention relates to a method of heating for use in the heat treatment of polyvinyl chloride and the like, more particularly to a method of high-speed heating employing microwave energy to generate heat with high uniformity in the interior of the material being treated.

2. Description of the Prior Art

In the production of polyvinyl chloride (PVC) for processing into film, sheet, floor covering material, wallpaper etc., there is a recent trend toward the use of larger and higher speed production equipment for the purpose of increasing production volume and decreasing production cost.

In the manufacture of PVC products, heat treatment processes are inevitably required for such purposes as plasticizing, gellating, melting and foaming the PVC. Conventionally, PVC has been heated using such devices as rollers, Banbury mixers, extruders, etc. which generate heat mechanically (by shearing, friction or thermal conduction) or, in the case of gellation and foaming, using an external heating system employing direct firing or some other heat source such as electricity, infrared radiation or steam.

These conventional heating methods have, however, often proved to be less than satisfactory from the points of high-speed production, energy conservation (economy), heating uniformity, etc. Moreover, a need has been felt for a heating method which is capable of high-speed temperature control (high-speed response) and thus of providing high efficiency.

Generally speaking, the hardness (flowability) of PVC can be freely controlled by adjusting the amount of plasticizer added thereto: PVC containing plasticizer at a ratio relative to the total of PVC and plasticizer of 0%, 10–30% and 30% or more being called hard, semi-hard and soft PVC respectively. Moreover, as the temperature of PVC rises, it becomes soft, with an attendant decline in tensile strength, Young's modulus and hardness, and an increase in elongation and elasticity. With further rise in temperature, it increases in flowability and passes into a molten state, whereafter, if no stabilizer is present, it will begin to undergo pyrolysis. The temperature at which softening and melting commences varies greatly with the quantity of stabilizer addition and the PVC composition.

FIG. 1 shows a block diagram of a conventional processes for manufacturer of PVC film or sheet. Briefly stated, these film or sheet manufacturing processes consist of a blending step b, a mixing and kneading step c, a warming step d, a conveying step e, a rolling step f, a cooling step g and a winding step i.

The PVC raw materials a, namely the plasticizer, coloring agent, filler, lubricant, etc., are accurately metered and forwarded to the blending step b where they are uniformly dispersed, mixed and blended in a blender. The blended mixture is then forwarded to the mixing and kneading step c where it is kneaded by knead-kneading rolls or the like and passed on to the warming step d where it is warmed by warming rolls so as to be thoroughly plasticized. The plasticized material is then slit into ribbon-like strips which are loaded on an oscillating conveyor in the conveying step e for transport to the rolling step f (sometimes being passed through a metal detector for the removal of foreign material on the way). They are then fed into the top bank of calender rolls.

Although the type and number of calender rolls used depends on the type and blending ratio of the raw materials, it is most common to use four or five L-type, inverted L-type or Z-type calender rolls. In calendering, the roll temperature is held between 160°–180° C. depending on the composition, with the temperature of the fourth roll generally being set 5°–20° C. higher than that of the second pair of rolls. The temperature of each roll is accurately controlled by forced circulation of high-pressure steam of high-pressure hot water.

The PVC material is rolled into film or sheet form by these rollers, passed on to the cooling step g for cooling and setting, trimmed along both edges to a constant width at the trimming step h and then cut after being wound to a prescribed length on a winder in the winding and cutting step i. The scraps from the trimming step i are sent to the pulverizer of a recovery step j for pulverization and recycling to the blending step where the pulverized material is mixed with the raw materials.

For obtaining a high-quality and stable film or sheet according to this manufacturing process it is essential to constantly maintain the top bank of the calender rolls under optimum rotating condition and this depends on constantly maintaining the temperature and material supply rate at optimum levels. These are extremely important factors in determining the quality of the final product.

The PVC is thus processed to the proper degree of plasticity, flowability and fusion by kneading, warming, extrusion, rolling and the other steps constituting the manufacturing process, and in the case of soft PVC containing a large amount of plasticizer it is relatively easy to obtain the desired plasticity, gellation and fusion with the equipment used for this purpose (kneading rolls, extruder, calender rolls, etc.). In the case of hard PVC containing no or only very little plasticizer, on the other hand, since the processing temperature and viscosity are higher and the required amount of driving power is greater, it is necessary to use higher strength processing equipment. As a result, production cost is increased by the need for more energy and more expensive equipment, while problems also arise from the point of processing technology since higher levels of technical expertise and operating skill are required to cope with the narrower range of optimum operating conditions dictated by the fact that hard PVC is more susceptible to pyrolysis than soft PVC and with the consequent need to add greater amounts of stabilizer. Because of this, the idea of using microwaves to heat PVC by high-speed vibration of the PVC molecules was taken up and tested.

The term "microwaves" refers generally to extremely short-wavelength electromagnetic waves, more specifically to such waves with wavelengths between 0.3–30cm. These waves are very readily absorbed by dielectrics having a polar radical such as water, alcohol etc. and when such a dielectric is irradiated by microwaves its molecules are subjected to high-speed internal vibration which results in the generation of heat. Microwaves thus provide a highly efficient heating effect and are therefore widely utilized in microwave ovens and other devices.

Conventionally when microwave heating has been used for PVC, it has been applied to the wound film or sheet in the winding step. When microwave energy is used in this way to bring the PVC from room temperature up to the gellation, fusion or foaming temperature, heat generation concentrates in certain local regions, inevitably causing these regions to rise to an abnormally high temperature and undergo pyrolysis and, eventually, even carbonization. Thus, up to now there has been no method for carrying out uniform heating using microwaves.

SUMMARY OF THE INVENTION

The object of the present invention is to provide a method of heating PVC which is free of the aforesaid problems encountered in the conventional heating step used in the production of PVC products, which provides rapid and uniform heating and which is highly energy efficient and therefore cheap to carry out.

This object of the present invention is attained by using a method wherein microwave energy is applied to the PVC after the temperature of the PVC has been raised to the point that its intermolecular bonding force has weakened and molecular vibration occurs readily, whereby heat is generated by high-speed molecular vibration extending into the interior of the PVC. This method makes it possible to conduct uniform heating of PVC with high energy utilization efficiency and, consequently, at low cost.

PVC is a crystalline polymer consisting of a mixture of relatively regularly arranged crystal portions and somewhat irregularly arranged noncrystalline portions. In the crystalline portions the space between molecules is small and the molecules are held together by a relatively strong intermolecular force. When an attempt is made to heat PVC in this state by the application of microwaves, it is not possible to realize efficient heating since the strong intermolecular force makes it difficult to induce high-speed molecular vibration. Even if heat is generated in some region where the intermolecular force is weak, the microwave-induced molecular vibration will merely concentrate in this region which, as a result, will be raised to an abnormally high temperature (suffer abnormal local temperature rise) and undergo pyrolysis and even carbonization. It is thus impossible to carry out uniform heating.

When the temperature of the PVC is raised in advance as in the case of this invention, however, micro-Brownian movement first becomes active in those PVC molecular segments in the noncrystalline portions where the intermolecular force is relatively weak, causing the space between molecules to increase, the intermolecular force to weaken and the PVC to soften. As the temperature rises further, the molecular movement becomes still more active and spreads progressively to the crystalline regions with higher intermolecular bonding force until eventually the PVC is fully plasticized throughout.

In this way, by applying the microwave energy after first creating a condition in which molecular vibration is easily induced, it is possible not only to make effective use of the heat generation mechanism of the microwaves but also to realize a considerable reduction in the amount of microwave energy required for raising the PVC to the final processing temperature aimed at. Moreover, as high-speed vibration is also induced in the crystalline portion bound by the strongest intermolecular force, it is possible to heat and raise the temperature of the PVC without any local heat concentration so that a large effect can be obtained with a small amount of microwave energy. Also, it was found that since microwaves propagate at the speed of light ($3 \times 10^8$ m/sec) and are therefore possessed of high-speed response capability, they can be effectively used for heating PVC in a high-speed PVC production process.

DESCRIPTION OF THE PREFERRED EMBODIMENT

Figure 1:
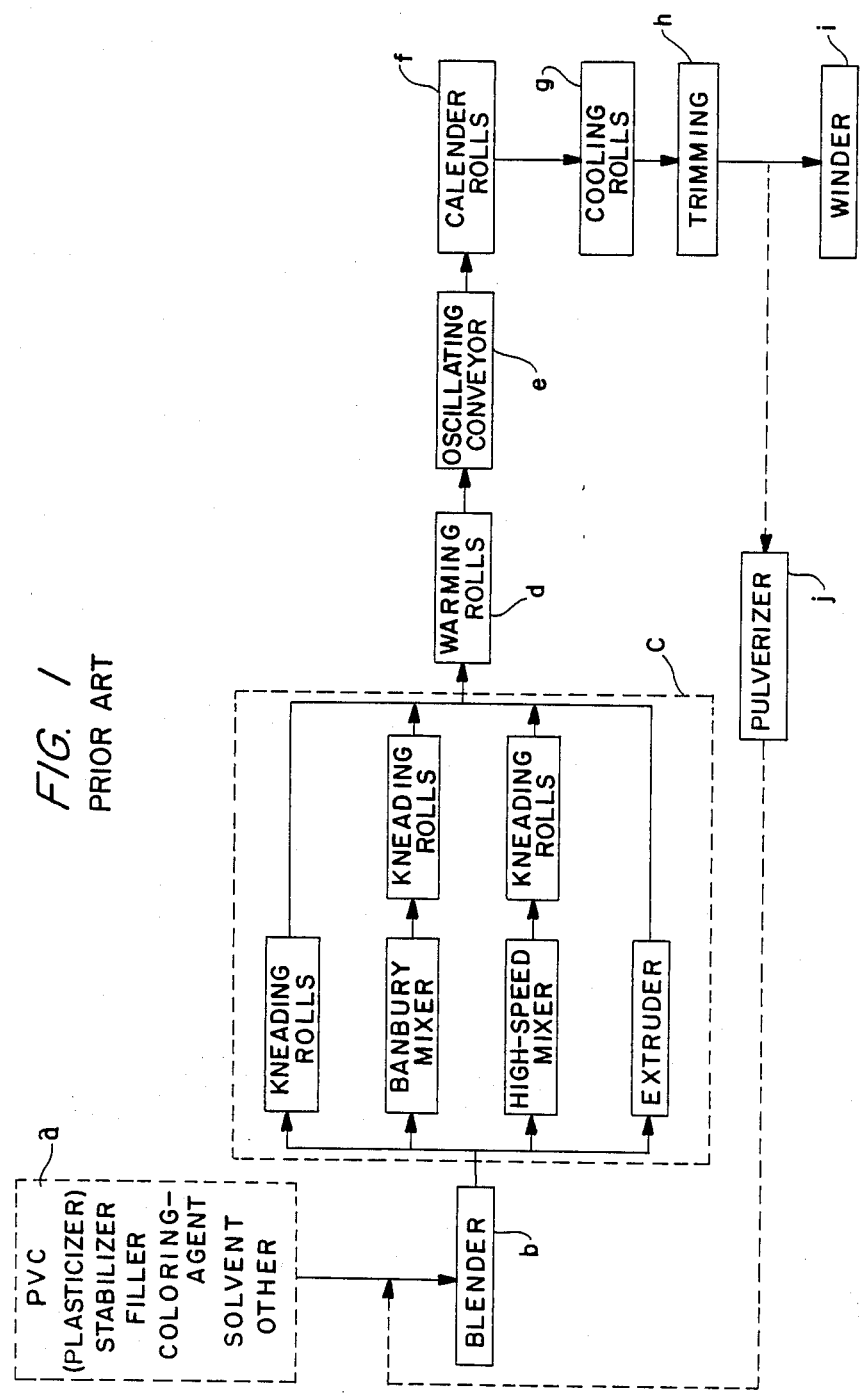
FIG. 1 is a block diagram showing conventional calender processing methods for manufacturing PVC film or sheet.
Figure 2:
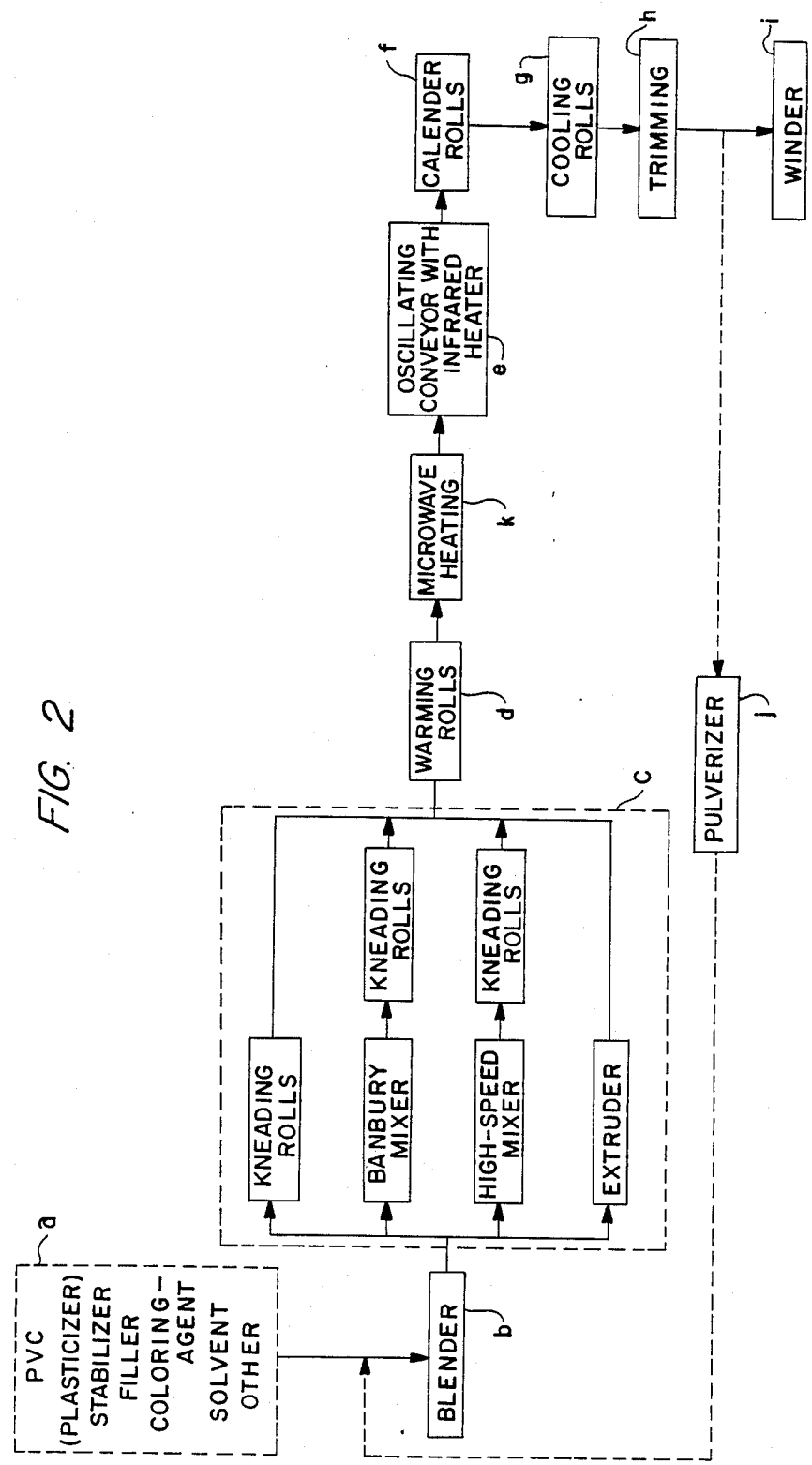
FIG. 2 is a block diagram showing processing methods for manufacturing PVC film employing the heating method of this invention.

A description will now be made of an embodiment to show concretely how the method of heating polyvinyl chloride by microwaves according to this invention is applied in actual practice. FIG. 2 is a block diagram showing an example of how the method of this invention is applied in the manufacture of PVC film or sheet with portions corresponding to those of the conventional method of FIG. 1 denoted by like reference symbols. As shown in FIG. 2, in this embodiment a microwave heating step k is provided between the steps corresponding to the warming step d and the conveying step e of the process shown in FIG. 1. In this step, the PVC material warmed in the preceding step is irradiated with microwave energy.

The PVC material heated by the absorption of microwaves is carried to the calender rolls by the oscillating conveyor provided in the conveying step e. In order to prevent loss of heat from the PVC while it is being transported in the conveying step following microwave heating, it is effective to provide the oscillating conveyor with an infrared or electric heater.

When the PVC warmed in the warming step is then heated by irradiation with microwaves in the following step as described in the foregoing, it is possible to heat all types of PVC, soft or hard, produced according to the highspeed manufacturing process and, moreover, to obtain ideal rotation and fusion conditions in the top bank of the calender rolls.

It should be noted that the method of employing microwave energy for heating according to this invention can be applied not only to the PVC taken as an example in the foregoing description but also to nylon and other plastic resins insofar as these have been added with a sesitizer having a polar radical in order to promote the absorption of microwave energy. Specifically, the method of this invention can also be applied to polyethylene, polyester, vinylon, polystyrene, polypropylene, etc.

Table 1 shows the conditions of a test conducted to determine the difference in effect when hard PVC (a ribbon-like strip containing 0% plasticizer and measuring 100 mm in width and 6 mm in thickness) is heated without preheating (No. 1) and with preheating according to this invention (No. 2).

TABLE 1

| Sample No. | Microwave frequency | Microwave output power | Processing speed | PVC starting temperature |
|---|---|---|---|---|
| No. 1 | 2450 MHz | 1.2 kW | 1.0 m/min | No preheating 15.5° C. (room |

TABLE 1-continued

| Sample No. | Microwave frequency | Microwave output power | Processing speed | PVC starting temperature |
|---|---|---|---|---|
| No. 2 | 2450 MHz | 0.8 kW | 1.2 m/min | temperature) Preheating by warming rolls 162° C. |

The PVC temperature and temperature uniformity of the two samples subjected to this test were as follows.

Sample No. 1: Local heating to abnormal temperatures of 200°–240° C. occurred, causing PVC pyrolysis and carbonization. The remaining portions were heated to only 50°–80° C. Uniform heating was thus impossible.

Sample No. 2: Uniform heating to 190° C.±2° C. was obtained throughout the PVC strip.

As seen from the foregoing, in accordance with the present invention uniform heating is realized in the PVC heating step by applying microwave energy to the PVC after the temperature of the PVC has been raised by warming rolls or the like to the point that its intermolecular bonding force has been weakened, whereby the microwaves cause high-speed molecular vibration and consequent heat generation extending into the interior of the PVC. Here, the PVC material passing through the kneading rolls, extruder, etc. used in conventional production equipment is raised to a temperature wherein it assumes a soft, plasticized state in which active molecular vibration occurs readily. As the PVC is then immediately subjected to microwave irradiation, high-speed vibration of the PVC molecules can be effectively realized and, moreover, as the PVC is already at a high temperature, the range of temperature increase is small so that heating can proceed with very little unevenness.

Further, since the microwave energy is applied after the bonding between the PVC crystals has been weakened, it is possible to realize a large effect with a relatively small amount of energy. For example, in the case of the manufacture of film or sheet using calender rolls as in the embodiment described above, it is possible to process 700–1000 kg/hr of soft PVC with a microwave output of 6–7 kW or to process 800–1000 kg/hr of hard PVC with a microwave output of 10–13 kW.

The method of this invention further provides the following effects.

(1) Control of the top bank temperature is facilitated since the amount of microwave energy applied can be controlled quickly and easily. It is thus possible to constantly maintain the top bank in the optimum state of fusion and rotation. Moreover, as an improvement in PVC rollability is obtained, it is possible to boost production volume by between several percent and several tens of percent.

(2) A major effect is obtained in terms of quality improvement since use of the method of this invention almost totally eliminates the occurrence of the streaks and wood grain marks which occur on the surface of the film or sheet in the conventional method when residual parts of the bank which have cooled because of their failure to rotate properly get mixed into rolled film or sheet and the occurrence of the fisheyes which are apt to occur in transparent or semitransparent film for similar reasons.

(3) Aside from the heat generated by friction between the calender rolls, heat supply to the PVC at the calender rolls has generally been through thermal conduction from the surface of the precisely temperature-controlled calender rolls. In accordance with the microwave heating method of this invention, however, since the PVC is already at optimum temperature when it is fed to the top bank of the calender rolls, it is possible to reduce the temperature of the rolls at each stage to a lower level than that conventionally used to thus realize a saving in energy as well as to enjoy an economic merit from the fact that since the PVC residence time is reduced thanks to the improved PVC rollability the amount of expensive stabilizer added to prevent pyrolysis of the PVC can be reduced.

(4) There is a recent trend toward increasing the degree of PVC polymerization in order to obtain hard PVC film and sheet products with enhanced physical properties. Increasing the degree of polymerization naturally necessitates higher processing temperatures, giving rise to problems in the conventional calender roll processing method as regards processing temperature and the cost increase caused by the need to use larger amounts of stabilizer. When the microwave heating system of this invention is employed, however, since the condition of the rotating fused bank can easily be optimized, the range of PVC raw materials that can be processed by calender processing can be extended to include even those with polymerization degrees which heretofore made them the most difficult to process ($\bar{P}=1300$–$1500$).

As explained in the foregoing, when the heating method of this invention wherein heat is internally generated in PVC by microwave-induced high-speed molecular vibration after the intermolecular bonding force of the PVC has been weakened is applied to the PVC production process, it becomes possible for the first time to uniformly heat all types of PVC (from soft to hard) using microwaves. It has further been demonstrated that the method of this invention can additionally provide a thermally efficient, quickly responsive, energy-efficient and economical way for preheating, heating, PVC raw material pellet-heating, drying and heating for gellation and foaming of artificial PVC leather and wall paper.

I claim:

1. A method of heating polyvinyl chloride using microwaves comprising the following steps:
   blending polyvinyl chloride raw materials;
   mixing and kneading the blended polyvinyl chloride;
   raising the temperature of the polyvinyl chloride by heating to the point where its intermolecular bonding force is weakened;
   while the polyvinyl chloride is still in this state of weakened intermolecular bonding force, applying microwave energy thereto to cause heat generation by microwave-induced high-speed molecular vibration extending into the interior of the polyvinyl chloride, whereby uniform heating is attained throughout the polyvinyl chloride;
   conveying the polyvinyl chloride;
   rolling the polyvinyl chloride to form a film;
   cooling the film of polyvinyl chloride; and
   winding the film of polyvinyl chloride.

2. A method of heating polyvinyl chloride according to claim 1, wherein 800–1000 kg/hr of hard polyvinyl chloride are produced applying microwave energy in the range of 10–13 kW.

3. A method of heating polyvinyl chloride using microwaves according to claim 1, wherein the polyvinyl chloride is nylon or other plastic resin, such as polyethylene, polyester, vinylone, polystyrene, polypropylene, added with a sensitizer having a polar radical for promoting absorption of microwave energy.

4. A method of heating polyvinyl chloride according to claim 1, wherein the polyvinyl chloride is raised to a temperature of approximately 162° C. by heating.

5. A method of heating polyvinyl chloride according to claim 1, wherein the combination of raising the temperature of the polyvinyl chloride and applying microwave energy elevates the temperature of the polyvinyl chloride to a uniform temperature of 190° C.

6. A method of heating polyvinyl chloride according to claim 1, wherein 700–1000 kg/hr of soft polyvinyl chloride are produced applying microwave energy in the range of 6–7 kW.

* * * * *